United States Patent [19]

Heck

[11] Patent Number: 5,352,391

[45] Date of Patent: Oct. 4, 1994

[54] GAS DISTRIBUTOR FOR SMALL-BUBBLE AERATION OF WATER

[75] Inventor: Urs V. Heck, Schmerikon, Switzerland

[73] Assignee: Bontec AG, Schmerikon, Switzerland

[21] Appl. No.: 72,481

[22] Filed: May 12, 1993

[30] Foreign Application Priority Data

Aug. 31, 1992 [CH] Switzerland .............. 02 722/92-3

[51] Int. Cl.$^5$ ........................................... B01F 3/04
[52] U.S. Cl. ............................ 261/122.2; 160/380; 160/402
[58] Field of Search .................... 261/122.2, 122.1; 160/380, 402

[56] References Cited

U.S. PATENT DOCUMENTS

| | | | |
|---|---|---|---|
| 2,629,432 | 2/1953 | Hanslick | 160/402 |
| 3,058,518 | 10/1962 | Housman | 160/380 |
| 3,529,653 | 9/1970 | Fey, Jr. | 160/402 |
| 4,189,880 | 2/1980 | Ballin | 160/380 |
| 4,232,310 | 11/1980 | Wilson | 160/380 |
| 4,234,035 | 11/1980 | Babbs | 160/402 |
| 4,485,574 | 12/1984 | Bennetot | 160/380 |
| 4,624,781 | 11/1986 | Messner . | |
| 4,723,367 | 2/1988 | Samoilov et al. | 160/380 |
| 4,842,732 | 6/1989 | Tharp | 261/122.1 |
| 5,009,050 | 4/1991 | Gruber | 160/402 |
| 5,015,034 | 5/1991 | Kendig et al. | 160/380 |
| 5,015,421 | 5/1991 | Messner | 261/122.2 |

FOREIGN PATENT DOCUMENTS

0359698 3/1990 European Pat. Off. .

*Primary Examiner*—Tim Miles
*Attorney, Agent, or Firm*—Cushman, Darby & Cushman

[57] ABSTRACT

The gas distributor is provided for aeration of water, particularly for the supply of oxygen in biological waste water treatment plants, but also for aeration of lakes whose oxygen content has been decreased due to the supply of pollutants. The gas distributor includes a base plate (2), over which a diaphragm (3) with fine openings (16) is stretched. Air, oxygen or other gases with such a volume per time unit are pumped between the base plate and the diaphragm (3) so that the diaphragm (3) expands slightly. Excessive expansion of the diaphragm is prevented by an upper grating part that extends over the total diaphragm (3). The diaphragm (3) is connected to the base plate (2) via a fastening device made of three members (6-8) that engage, for example, a recess (11) that has a dovetail-shaped cross-section. The diaphragms (3) are clamped to the base plate by means of a snap closure. The present embodiment uses no adhesive that could damage the diaphragm (3). Moreover, the finished gas distributor plates are delivered ready to operate to the point of use and assembly, exchange and maintenance can be greatly simplified or sped up in comparison to conventional designs.

16 Claims, 7 Drawing Sheets

GAS DISTRIBUTOR FOR SMALL-BUBBLE AERATION OF WATER

BACKGROUND OF THE INVENTION

The invention relates to a gas distributor for small-bubble aeration of water.

Gas distributors of this type are used in the aeration of water, for instance in biological waste water treatment plants, or for supplying oxygen to improve living conditions in lakes (artificial respiration).

In conventional gas distributors, it is assumed that each longitudinal and transverse side of the bottom plate has separate joints so that a total of four lateral joints is required per plate. In this case, problems may arise at the four junction points in the corners between the individual profiled sections, because the diaphragm at these points may tend to tear easily and therefore must be replaced. Furthermore, conventional gas distributors typically include L-shaped or angular members which are only designed or suitable for straight, and not for curved structures. Typically, a member is inserted into the space defined by the two assembled L-members and the diaphragm. In these distributors, the member can only be inserted from one of the two ends of the recess, because of which, the diaphragm may easily be touched and be possibly damaged.

Moreover, conventional gas distributors include suppressing elements, which are secured by means of screws that extend through the diaphragm and, as a result, may possibly damage it. The application of such elements in conventional gas distributors is not only time-consuming, but poses a danger of damaging the diaphragm. Such damage occurs gradually and is the result of the variable pressure conditions between the diaphragm and the base plate.

Thus, there is a need to provide a gas distributor which ensures that a sufficient air circulation space exits between the suppressing elements and base element so as to reduce the formation of bulges, and thus increase the efficiency of the device.

Further, in conventional gas distributors, strips and screws are used to secure the diaphragm to the base plate, in the course of which different materials, such as stainless steel and plastic, are screwed together. Under the effects of heat and cold, this can lead to tensions and tears due to varying expansion coefficients. Furthermore, clamping methods are used, although this type of fastening is associated with difficulties under varying pressure. With the methods of adhesion used, there is the danger that the diaphragm will be damaged while being pulled away. Finally, changing a foil is so labor-intensive with known methods that the process is no longer practical.

SUMMARY OF THE INVENTION

The object of the present invention, therefore, is to create a gas distributor that has none of the disadvantages of existing constructions.

The desired gas distributor is intended to facilitate both manufacture and repair. It is also intended to be transported in the finished state to the point of assembly and assembled there with a small expenditure of labor.

The gas distributor created in this way has the following as well as other advantages over conventional constructions:

a totally problem-free seal of the corner areas of the diaphragm;

changing the diaphragm during required service operations is greatly facilitated;

damage to the diaphragm caused by the loosening of adhesive connections is prevented;

damage caused by varying temperature coefficients of the individual materials is avoided; and it is possible to re-use the individual diaphragms repeatedly.

Exemplary embodiments of the gas distributor in accordance with the invention are explained in further detail below by means of the drawings.

DETAILED DESCRIPTION OF THE PRESENTLY PREFERRED EXEMPLARY EMBODIMENTS

Figures 1, 2:
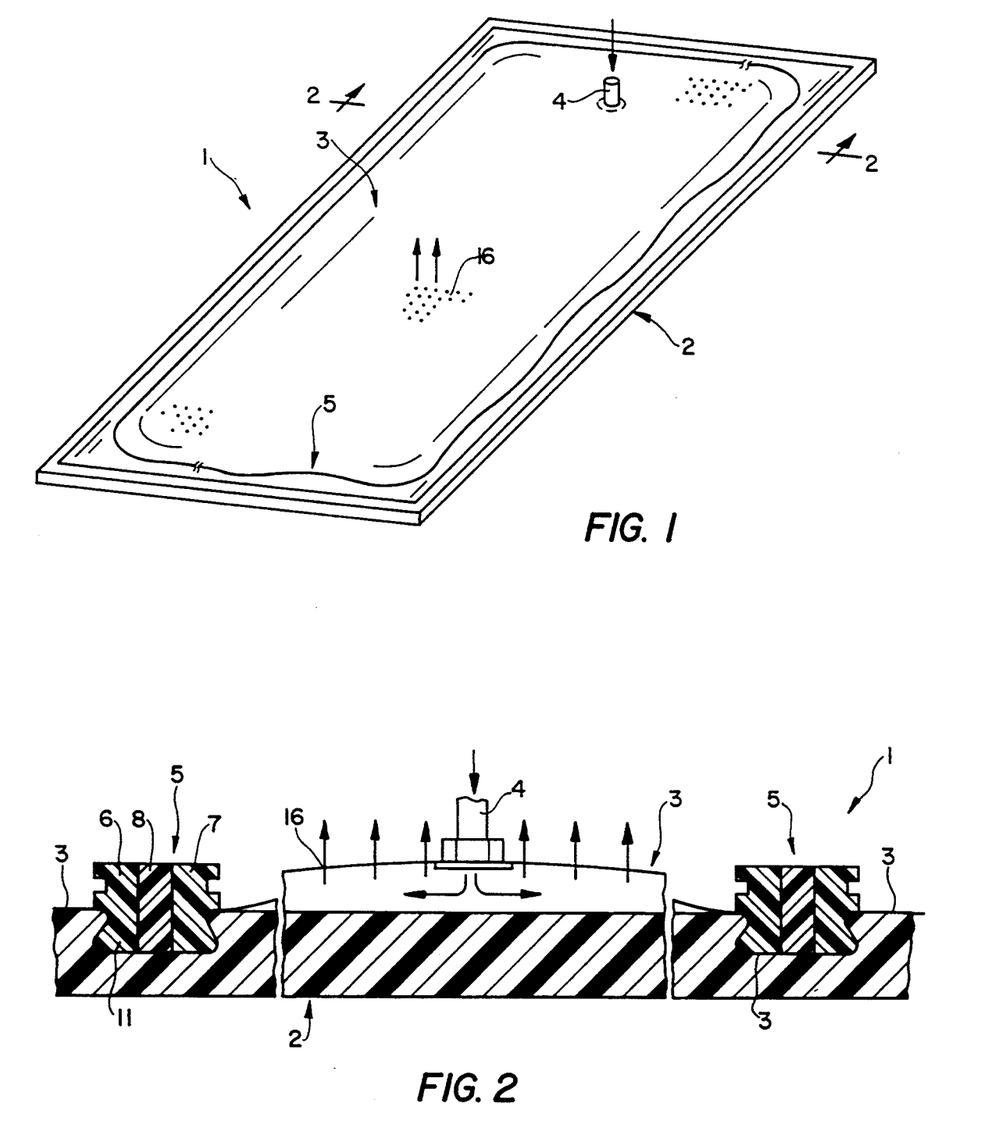
FIG. 1 shows an oblique view of an aeration plate with a base plate and a diaphragm clamped thereto.
FIG. 2 shows a cross-section along the line 2—2 of FIG. 1 in the operating state.

FIGS. 1–4 show an aeration plate 1 that has a base plate 2 and a diaphragm 3 fastened to it with a pipe connection 4 for supplying fresh air, oxygen or other gases. The base plate 2 is preferably made of plastic, but can also be made of wood, wood fibers or the like. The diaphragm 3 is preferably a resilient rubber, gas or air distributor foil provided with openings 16. Air or gas is supplied through the pipe connection 4 to the space between the base plate 2 and the diaphragm 3. The air or gas causes the diaphragm 3 to bulge under an interior pressure, as shown in FIG. 2. The quantity of gas flowing through the openings 16 is fixed by the design of the diaphragm 3.

Figure 3:
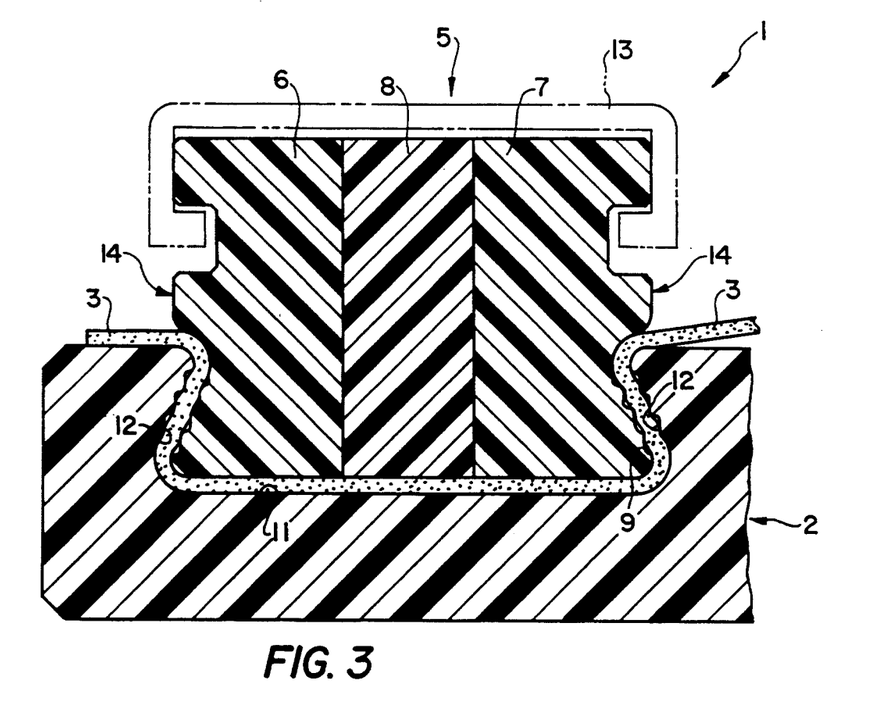
FIG. 3 is an enlargement of a portion of FIG. 2 showing the fastening device of the invention.
Figure 4:
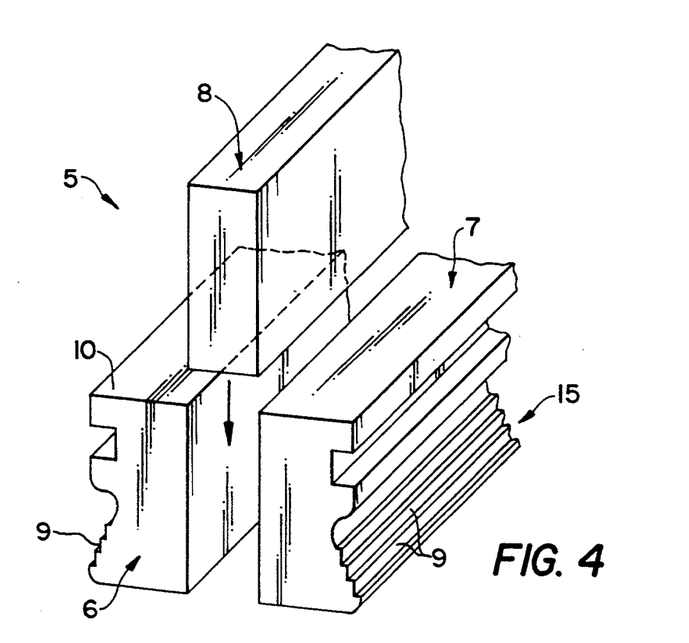
FIG. 4 is an oblique view of the three fastening members in FIG. 3.

A fastening device 5 that connects the diaphragm 3 with the base plate 2 is shown on both sides of the aeration plate 1. The fastening device is disposed about the entire periphery of diaphragm 3. The fastening device 5 comprises three fastener members 6 through 8, of which the two outer members 6 and 7 are identical, and their backs face each other. The third member 8 is pressed between these backs. As shown in FIGS. 3 and 4, the three members 6 through 8 have approximately the same width and height, but the outer members 6 and 7 are provided on one side (their outer side) with projections 10 and grooves 9, which are pressed tightly via diaphragm 3 against the side-wall 12. Sidewalls 12 are step-like in cross-section and form a part of a dovetail-shaped recess 11 in the base plate 2. The sides of the two members 6 and 7 that rest against the sidewall 12 are likewise step-like in cross-section, which ensures that diaphragm 3 is clamped without being damaged.

When internal pressure between the diaphragm 3 and the base plate 2 increases due to the air or gas, the three members 6 through 8 are together pressed upwardly in the direction of the recess 11. Therefore, the pressure or the adhesion between the fastening device 5 and the diaphragm 3 is increased, since the recess 11 is narrower at a top portion thereof. Further, the width of the fastening device 5 does not allow it to be removed from the recess, as long as the third or center member 8 is not removed.

The clamped center member 8 can be equipped with barbed longitudinal grooves that engage the adjacent walls of the outer members 6 and 7 preventing member 8 from working itself free. Moreover, clamps 13 are provided and extend around the three members 6 through 8 engaging the exterior walls 14 of the two outer members 6 and 7 (FIG. 3). To maintain the engagement between the clamps 13 and the exterior walls 14 for an extended period of time, walls 14 include grooves 95.

To assemble the gas distributor, first, a base plate 2 having a recess 11 is produced that preferably has a dovetail-shaped cross-section. The two outer members 6, 7 are placed into recess 11 such that each of their side faces, which extend diagonally to the base plate, rests against the sidewall 12 of the dovetail-shaped recess 11 clamping diaphragm 3 therebetween. Subsequently, the center member 8 is pressed between the two outer members. The pressing procedure is preferably effected manually or mechaninically by means of a roller, under pressure, that extends from one end of the base plate to the other.

The individual fastener members 6 through 8 can also be flexible rods or rings.

To simplify assembly, the two outer members 6, 7 can be connected by thin plastic bars (not shown), for example, that extend along diaphragm 3.

The use of clamps 13 for securing the three members 6 through 8 in the recess 11 is for increased safety, and is not a necessity. However, the application of clamps 13 using a special tool requires only a very small expenditure of labor, so that assembly costs are virtually negligible. To seat the clamps 13 securely, an upper part of the exterior faces 14 of the two outer members 6, 7 include grooves, 95 wherein the clamps 13 are hooked.

As an alternative to providing clamps 13 to hold the fastening members in position, the outside of the center member may include barbed projections that extend over their total length. In addition, the interior faces of the outer members 6, 7 may include recesses that engage the projections of the center member 8.

Parts of the exterior faces of the outer members 6, 7 which engage the diaphragm 3 in recess 11 include a step-like cross-section to ensure secure engagement with the diaphragm 3. The saw-teeth that results, engages the diaphragm 3 without damaging it.

Figure 5:
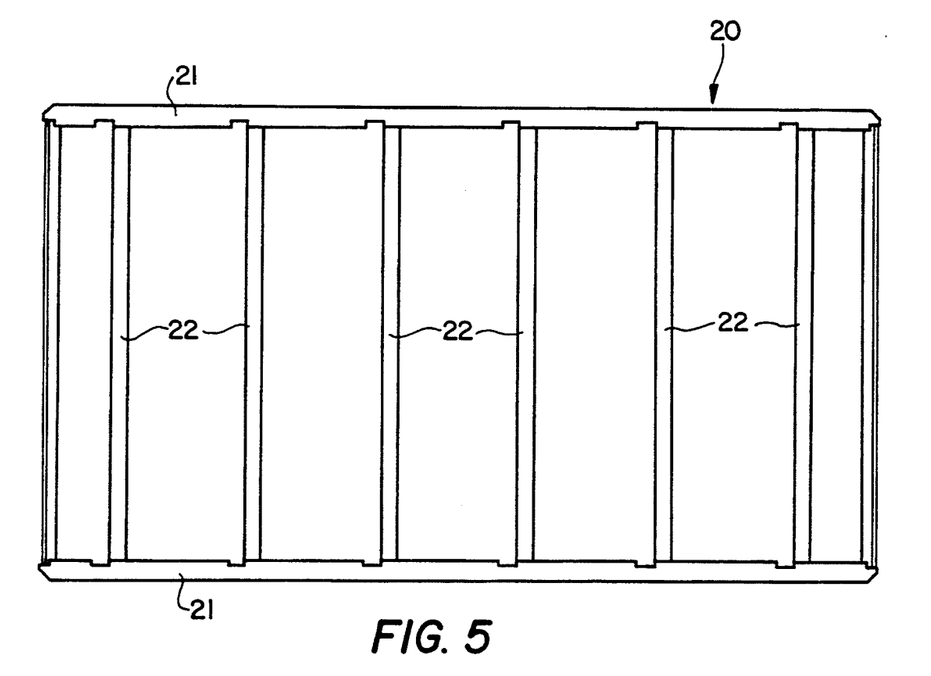
FIG. 5 is a plan view of a bottom plate for receiving and securing a base plate.

FIG. 5 shows a bottom plate 20 that is self-contained and disposed on the bottom of a lake or basin to receive and secure the base plate 2. The bottom plate 20 comprises longitudinal and transverse supports 21 and 22, respectively, which are preferably screwed or welded together. The bottom plate is secured to the bottom of a lake or a basin; it is designed to have a longer service life and, in contrast to the base plate 2, is not intended to be removed and exchanged. The bottom plate 20 thus, normally requires no maintenance.

Figure 6:
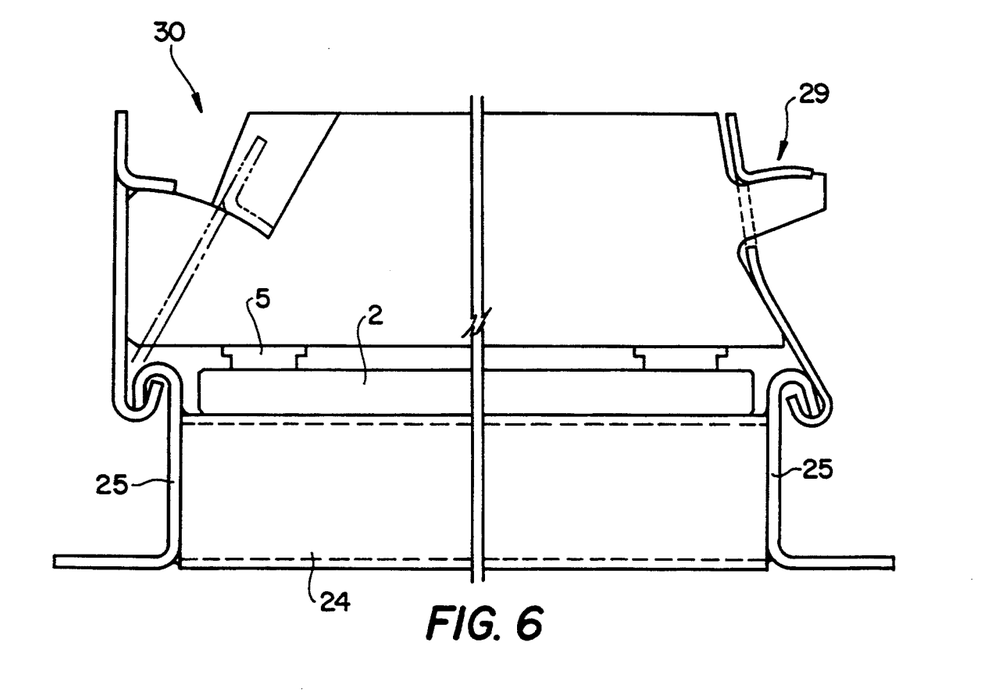
FIG. 6 is an end view showing the base plate fastened to the bottom plate.
Figure 7:
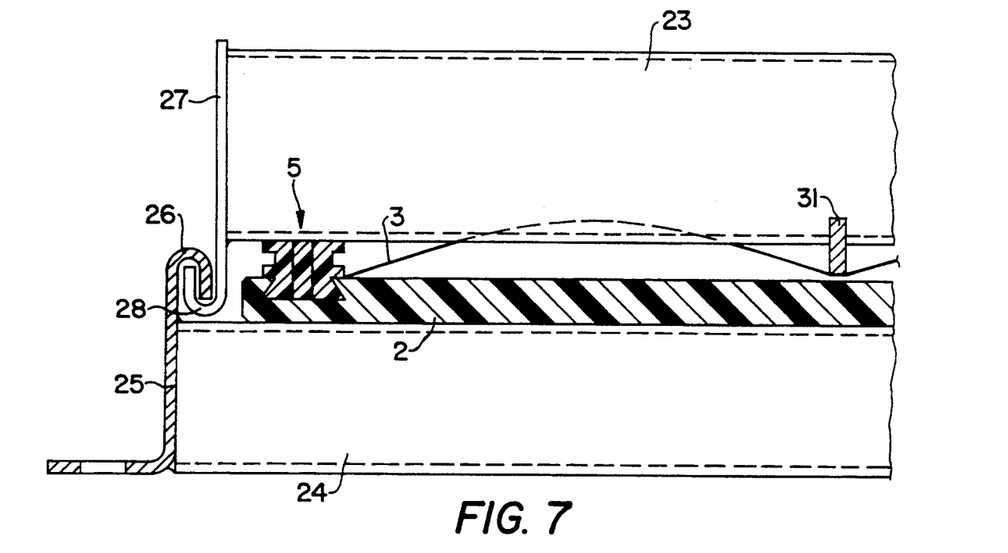
FIG. 7 is a section through an upper grating part and a lower grating part having a snap closure.

FIG. 7 is a cross-sectional view through a portion of a self-contained lower grating part 24 which is part of the bottom plate 20, to which an upper grating part 23 is secured. The two grating parts 23 and 24 are connected at one end by an angle iron 25 that is secured to the bottom of the lake. The angle iron 25 is curved at a top portion into a hook 26, which is engaged by an additional hook 28 of a flat steel bar 27. When the base plate 2 is disposed on top of the bottom plate :20, the hook 28 on the upper grating part 23 is inserted into the hook 26 of the lower grating part 24 and braced by means of a snap closure 29 of the type represented in FIG. 6. Snap closures 29, 30 are known, and are not explained in further detail herein.

Figure 8:
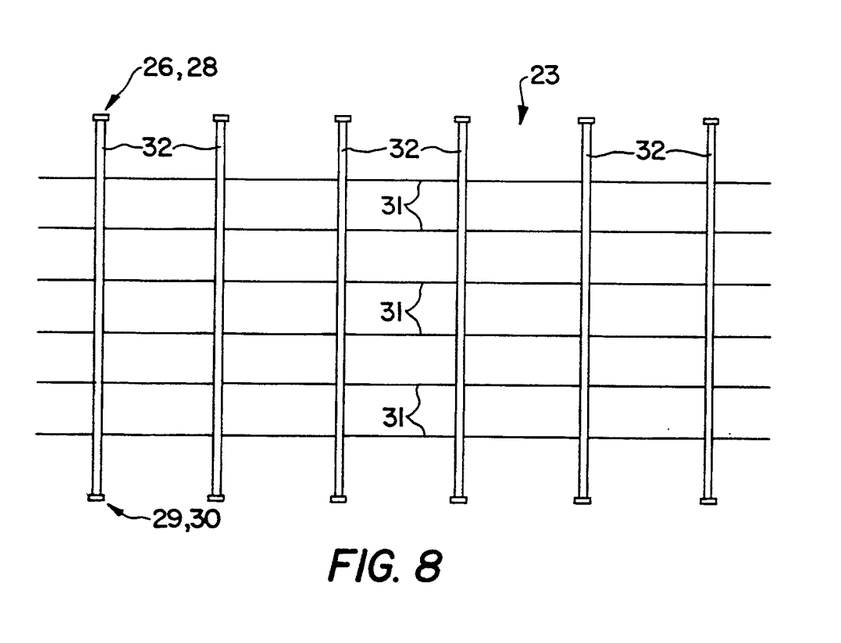
FIG. 8 is a plan view of the upper grating part for holding the base plate to the bottom plate.

The upper grating part 23 (FIG. 8) comprises a plurality of longitudinal and transverse supports 31 and 32, respectively, which are connected to each other. The transverse supports 32, on the one longitudinal side of the grating part, are provided with flat steel bar 27 having hook 28. The other side of the grating part includes the snap closures 29, 30.

With the above-mentioned fastening, no screws or glued spots must be loosened in order to exchange the diaphragms. The upper grating part 23 needs merely to be released by means of the snap closures 29, 30 and raised, after which, the base plate 2 and thus the diaphragm 3 can be raised. Connecting the two grating parts 23, 24 by means of hooks 26, 28 and snap closures 29, 30 is also advantageous, in that the likelihood of puncturing the diaphragm 3 is reduced, thus reducing tearing of the diaphragm.

The upper grating part 23 not only secures the base plate 2, with the diaphragm 3, to the lower grating part 24 the grating part also prevents the diaphragm 3 from stretching too far upward due to the effect of the air or the like injected between the base plate 2 and the diaphragm 3. The diaphragm 3 is also prevented from bursting due to excess expansion.

Figure 9:
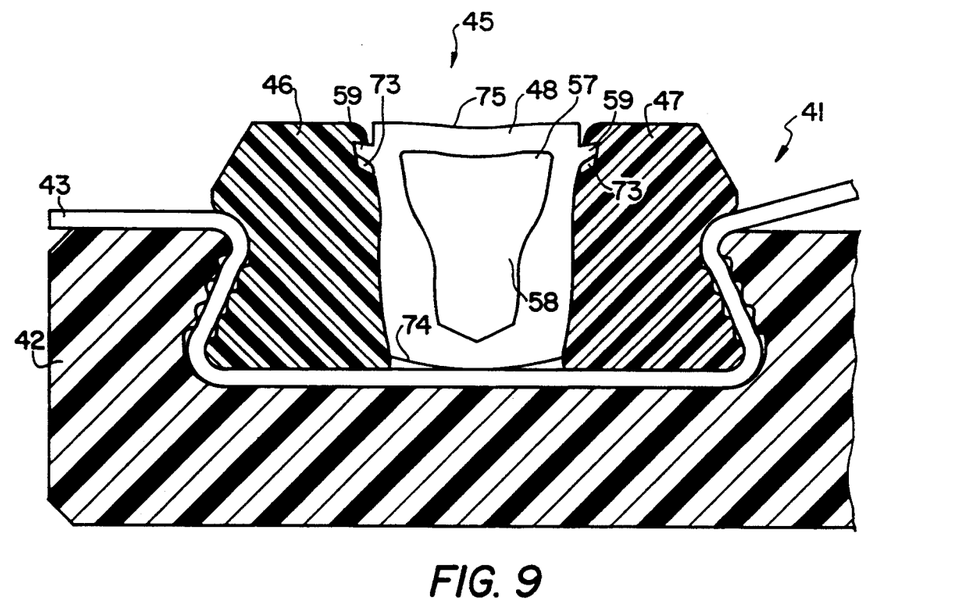
FIG. 9 is a first variation of FIG. 3.

FIG. 9 shows a variant of FIG. 3 wherein the clamp 13 is eliminated. In this design, the two outer members 46, 47 of the fastening device 45 are identical and only slightly compressible, however, the center member 48 can be greatly compressed. Member 48 has one or a plurality of hollow chambers 57, 58 in its interior which makes member 48 compressible. The compressibility accommodates the positive tolerances of the two outer members 46, 47. Moreover, center member 48 is provided with extensions 59 on the faces opposite the outer members 46, 47 the extensions 59 extend in the longitudinal direction and engage correspondingly designed grooves 73. As the center member 48 is pressed, it is squeezed together and expands thereafter due to its resilience in the inserted position, such that the extensions 59 engage the grooves 73. The center member 48 thus engages the two outer members 46 and 47 both non-positively and form-fittingly, The outer members 46 and 47 are pressed outwardly against the diaphragm 43. When the center or the third member 48 is required to be removed, the extensions 59 and the grooves 73 that engage each other are pressed apart, so that their engagement is released on each side of the center member thus permitting the center member 48 to be removed. The extension 59 is slightly hook-like in cross-section such that actual hooking takes place, preventing the center member 48 from slipping out. On the other hand, the lower face of the hook-like extension 59 runs diagonally upward so that it can be easily pushed in. In its lower section, the center member 48 is of such size that it presses the outer members 46, 47 against the diaphragm 43 by means of elastic spring force. In the tensed state, the upper and lower faces 74 and 75 are deformed.

Figure 10:
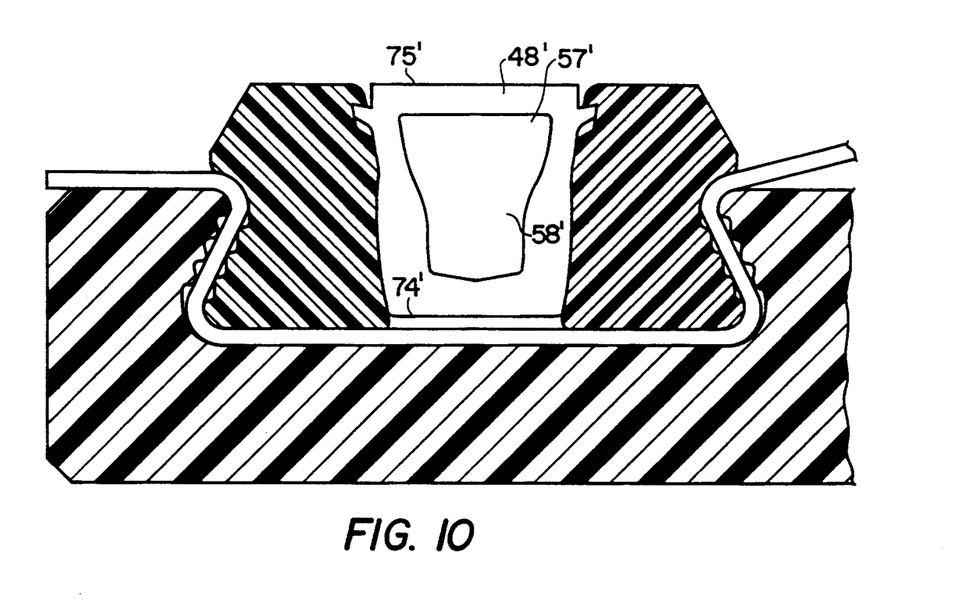
FIG. 10 is a second variation of FIG. 3.

FIG. 10 shows a variant that is very similar to FIG. 9; the only difference is that the center member 48' is not comprised in the inserted position, because the outer members 46 have no positive tolerances. It can be seen from FIG. 10 that the two faces 74' and 75' are not deformed and are basically parallel.

Figures 11, 12, 13:
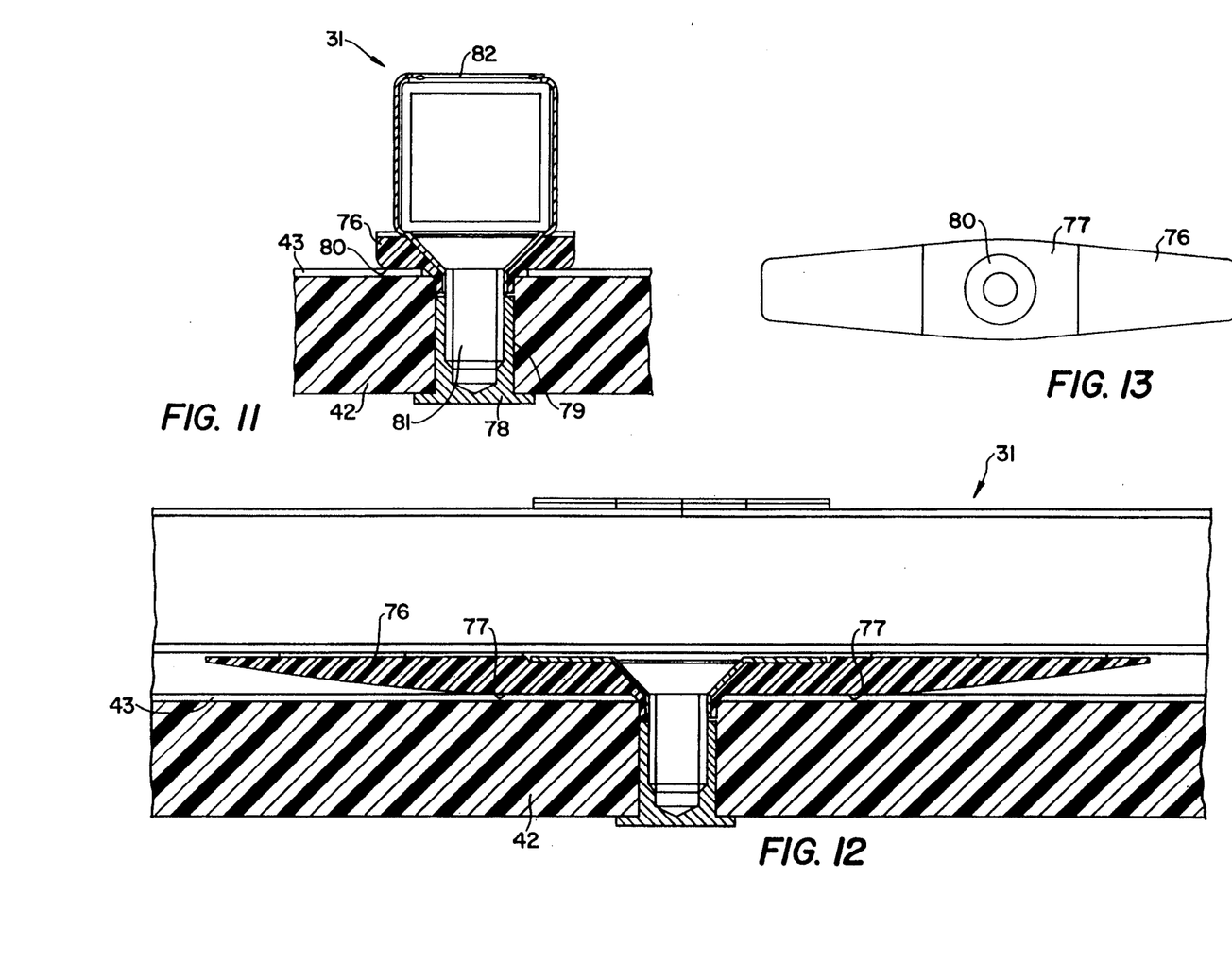
FIG. 11 is a vertical transverse cross-section through a longitudinal support for holding the aeration diaphragm.
FIG. 12 is a vertical longitudinal section through the longitudinal support of FIG. 11.
FIG. 13 is a plan view of the supporting body for the diaphragm, disposed beneath the longitudinal support in FIG. 12.

FIGS. 11 and 12 show fastening of the diaphragm 43 by means of the longitudinal supports 31. A longitudinal support 31 is represented in cross-section in FIG. 11 and in a side view in FIG. 12. In addition, FIG. 13 is a plan view of a propeller-type body 76, for protecting the diaphragm when the diaphragm is under pressure. When the diaphragm 43 bulges, the diaphragm presses against the body 76 so that it is not under too much tension in the fastening area.

The diaphragm is, for instance, fastened at two or more places between the ends of the single longitudinal support 31, as shown in FIGS. 11 and 12. The body 76 is level in the fastening area, and presses the diaphragm 43 against the base plate 42. For this purpose, a threaded sleeve 78 having a collar, is inserted from below into a fastening hole 79. The body 76 is inserted into a hole with a frustoconical wall 80. Clamping plates 82 are used to hold the longitudinal support 31, and the longitudinal support 31 is not inserted until it has been fastened by screws 81.

Figure 14:
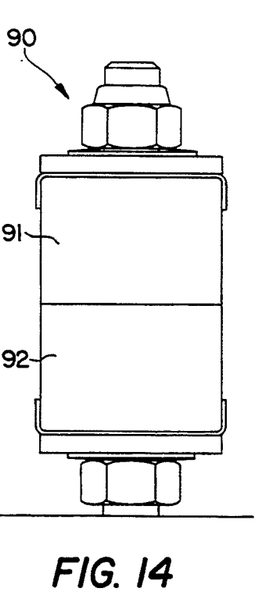
FIG. 14 is a rear view of a snap closure for holding the aeration plate.
Figure 15:
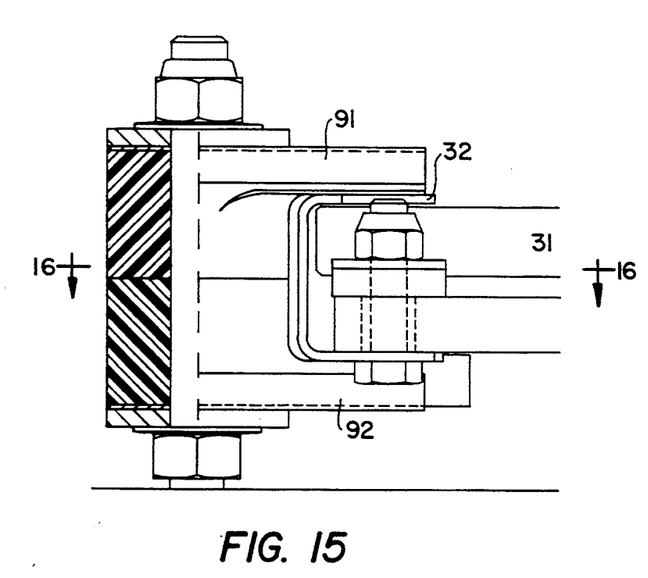
FIG. 15 is a schematic side view of the snap closure of FIG. 14, partially in section.
Figure 16:
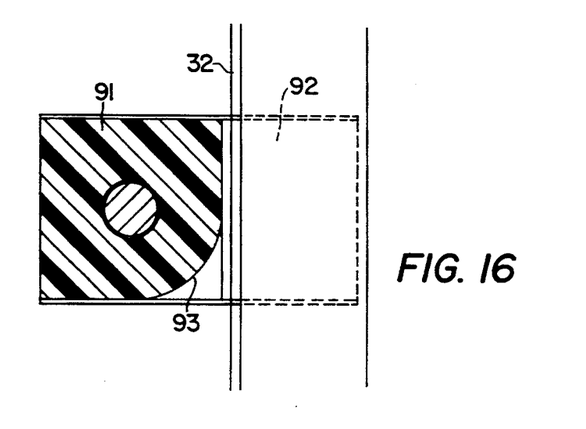
FIG. 16 is a section along the line 16—16 in FIG. 15.

FIGS. 14 through 16 show a snap closure 90 for clamping the base plate 42 with the diaphragm 43 and longitudinal support 31 to the transverse support 32. FIG. 14 shows a side view in the longitudinal direction of the transverse support 32 in the tense state. The snap closure 90 surrounds an upper part 91, which is rotatable by 90° in relation to, or together with, a lower part 92 for accelerating assembly. For this purpose, the edge 93 is rounded off.

To one skilled in the art, it is obvious that numerous deviations from the embodiments described here are possible within the scope of protection established in the claims.

Moreover, the fastening disclosed herein allows the base plate to expand or contract freely under the influences of heat and cold without allowing warping or tearing. Most significantly, the fastening permits the use of materials of varying heat expansion coefficients for the longitudinal and transverse supports.

A further advantage of the present design is that the finished plate is self-contained and stable. It can be delivered ready for assembly, and can be assembled quickly.

It is also pointed out that the material used is recyclable, and that the different expansion coefficients cause no tensions at operating temperatures.

The embodiment shown in FIGS. 11 and 12 permits a very precisely centered, clean assembly of the form or clamping body 76, which is very significant for the avoidance of tensions in the foil.

I claim:

1. A gas distributor for bubble aeration of water comprising:
   a bottom plate;
   a base plate coupled to said bottom plate;
   a perforated diaphragm member coupled to said base plate; and
   a continuous fastening and sealing assembly for fastening and sealing a periphery of said diaphragm member to said base plate such that the diaphragm member rests on top of said base plate when a gas supply is minimal and such that said diaphragm bulges during supply of gas between said base plate and said diaphragm member,
   said fastening and sealing assembly including:
      two outer fastening members having a half dovetail cross-section for insertion into a mating dovetail recess defined in said base plate; and
      a center fastening member,
      said two outer fastening members being pre-stressed outwardly against sidewalls of said recess by said center fastening member,
      said two outer fastening members and said center fastening member having substantially similar height and widths and being flexible in a dimensionally stable manner in a plane of the base plate permitting said fastening and sealing assembly to define curved portions thereof while maintaining a fastening and sealing function at the periphery of said diaphragm member,
      said sidewalls and said two outer fastening members having mating step-like cross-sections.

2. The gas distributor as defined by claim 1, wherein the center fastening member has one of smooth side faces and side faces with barbed extensions that engage grooves in mating sides of said outer fastening members.

3. The gas distributor as defined by claim 2, further comprising:
   a lower grating part;
   an upper grating part; and
   hook and snap closures,
   said base plate being secured, with the diaphragm member disposed thereon, between the lower grating part and the upper grating part by the hook and snap closures.

4. The gas distributor as defined by claim 3, wherein the snap closure are one of closed and released by a rotating movement of 90°.

5. The gas distributor as defined by claim 3, further comprising a form body disposed above said base plate and diaphragm member, said form body, said base plate and said diaphragm member being connected to each other by longitudinal supports.

6. The gas distributor as defined by claim 1, further comprising:
   a lower grating part;
   an upper grating part; and
   hook and snap closures,
   said base plate being secured, with the diaphragm member disposed thereon, between the lower grating part and the upper grating part by the hook and snap closures.

7. The gas distributor as defined by claim 6, further comprising a form body disposed above said base plate and diaphragm member, said form body, said base plate and said diaphragm member being connected to each other by longitudinal supports.

8. The gas distributor as defined by claim 6, wherein the snap closures are one of closed and released by a rotating movement of 90°.

9. The gas distributor as defined by claim 1, wherein a cross-section of an end of the center fastening member that faces the diaphragm member is tapered to an opposite end thereof.

10. The gas distributor as defined by claim 9, wherein each fastening member is continuous, and that the recess extends in a slightly snake-like path in the base plate.

11. The gas distributor as defined by claim 1, wherein each fastening member is constructed and arranged to engage a curved recess in the base plate, the curved recess having a dovetail cross-section.

12. The gas distributor as defied by claim 11, wherein each fastening member is continuous, and that the recess extends in a slightly snake-like path in the base plate.

13. The gas distributor as defined by claim 1 wherein each fastening member angularly surrounds an edge of a total center area of the base plate and the diaphragm member, thereby forming a press-fit seal.

14. The gas distributor as defined by claim 13, wherein each fastening member is continuous, and tat the recess extends in a slightly snake-like path in the base plate.

15. The gas distributor as defined by claim 1, wherein a side face of the two outer fastening members facing the sidewall of the recess is provided with grooves that are step-like in cross-section to securely hold the diaphragm member.

16. The gas distributor as defined by claim 15, wherein each fastening member is continuous, and that the recess extends in a slightly snake-like path in the base plate.

* * * * *